United States Patent [19]
Tsuji et al.

[11] 3,907,958
[45] Sept. 23, 1975

[54] HIGHLY FLAME-RETARDANT SHAPED ARTICLES AND METHOD FOR PREPARING THE SAME

[75] Inventors: Tadashi Tsuji; Mikio Korematsu, both of Yatsushiro, Japan

[73] Assignee: Kabushiki Kaisha Kohjin, Shinba, Japan

[22] Filed: Oct. 8, 1974

[21] Appl. No.: 513,200

Related U.S. Application Data

[60] Division of Ser. No. 242,745, April 10, 1972, Pat. No. 3,859,390, and a continuation-in-part of Ser. No. 43,977, June 5, 1970, abandoned.

[52] U.S. Cl. .............. 264/184; 8/115.5; 8/DIG. 10; 260/45.75 K; 260/876 R; 260/890; 260/897 C; 264/185
[51] Int. Cl. ............................................ C08f 29/24
[58] Field of Search ........... 260/876, 890, 897, 899, 260/45.75 K; 8/115.5, DIG. 10; 264/184

*Primary Examiner*—John C. Bleutge
*Assistant Examiner*—C. J. Seccuro
*Attorney, Agent, or Firm*—Fred Philpitt

[57] ABSTRACT

Shaped articles such as fibers and films having durable, highly flame-retardant property comprising a halogen-containing polymer and polyvinyl alcohol including its acetal, as principal constituents, and tin substantially in the form of stannic acid. Said shaped articles are produced by a method (A) comprising subjecting shaped articles such as polymer blend fibers containing a halogen-containing polymer and polyvinyl alcohol, as principal constituents, to acetalization in an acetalizing bath containing a tin salt of a strong acid, and converting it to stannic acid substantially afterwards by increase of pH in the articles; alternatively by a method (B) comprising blending an aqueous solution of polyvinyl alcohol, an emulsion of a halogen-containing polymer and an aqueous dispersion of stannic acid or stannic acid anhydride, and subjecting the resulting solution of the polymer blend to emulsion spinning technique; or by a method (C) comprising treating shaped articles such as polymer blend fibers containing, as principal constituents, a halogen-containing polymer and partially acetalized polyvinyl alcohol, with an aqueous solution of a tin salt of a strong acid and converting it to stannic acid substantially afterward by increase of pH in the shaped articles.

2 Claims, No Drawings

HIGHLY FLAME-RETARDANT SHAPED ARTICLES AND METHOD FOR PREPARING THE SAME

DESCRIPTION OF THE INVENTION

This application is a division of Ser. No. 242,745, filed Apr. 10, 1972, now U.S. Pat. No. 3,859,390, and a continuation-in-part of Ser. No. 43,977, filed June 5, 1970, now abandoned.

This invention relates to the shaped articles having durable, highly flame-retardant property which comprise a halogen containing polymer and polyvinyl alcohol, as principal constituents, and tin substantially in the form of stannic acid, and several methods for producing same.

It has long been desirous to give fibers and textiles flame-retardant property without degrading their inherent good properties, and several fibers having such a property and methods for producing same have been already proposed and actual products having undergone flame-retardant processing have been sold.

However, such flame-retardant fibers and textiles have not always been satisfactory, for various reasons, for example: because of their poor dyeability, low softening and shrinking temperatures and poor mechanical properties. Most of the flame-retardant processings have difficulty in the point of change of handle (mostly stiffening), degradation of fiber-properties and insufficient durability of the flame-retardant effect and rise of cost, etc.

One object of the present invention is to provide shaped articles such as fibers and films having highly improved and durable flame-retardant property while retaining their good properties necessary for common use such as superior dyeability, softness and mechanical properties. Flame-retardant property means herein that articles show decomposition, carbonization and ignition during the time of contact with an igniting flame but are self-extinguishing on removing the flame.

As already known, polymer blend fibers having superior fiber-properties can be prepared by subjecting polyvinyl chloride emulsion to wet emulsion spinning using polyvinyl alcohol as a matrix to make the emulsion components continuous. (e.g. Mikio Korematsu: Polymer Application (KOBUNSHI KAKOU) 16, 9, [1967] and Journal of the Textile Machinery Society of Japan 22, 721, [1969] and U.S. Pat. No. 3,111,370 issued Nov. 19, 1963 to Okamura et al.) However, their flame retardant property is not satisfactory, and textiles made of the fibers often keep burning even after removed from an igniting flame although their burning becomes much slower, if design and weight per unit area of the textiles are not suitable and the proper selection of the processing agent or starching agent is not made. Accordingly, it has been desired to give these fibers a further higher grade flame-retardant property in order to be used in wider varieties of application fields.

Another object of the present invention is to provide new methods for producing the above-mentioned shaped articles such as film and fibers economically.

These objects can be attained by the shaped articles of the present invention and the methods for producing same.

The present invention resides in shaped articles comprising as their principal constituents, a halogen-containing polymer and polyvinyl alcohol (or partially acetylized polyvinyl alcohol) in the weight ratio of from 2:8 to 8:2, and from 0.1 to 15 percent by weight of tin (substantially in the form of stannic acid) based upon the total weight of the principal constituents. "Substantially" means herein that a small amount may be included in the form of a derivative of stannic acid, but the greater part of tin is in the form of stannic acid and its anhydride.

The invention also resides in a method (A) for producing shaped articles having highly flame-retardant property, which comprises acetalizing a polymer blend article whose principal components are a halogen-containing polymer and polyvinyl alcohol, in an acetalizing bath containing aldehyde and a tin salt of a strong acid which is then adsorbed in the articles and hydrolyzed substantially in the form of stannic acid.

The invention also consists in a method (B) for producing shaped articles having highly flame-retardant property, which comprises blending an equeous solution of polyvinyl alcohol, an aqueous emulsion of a halogen-containing polymer and an aqueous dispersion of stannic acid or stannic acid anhydride to give a dope having a ratio of polyvinyl alcohol to said halogen-containing polymer of 2:8 – 8:2 and a stannic acid content of 0.15 – 5 percent per total weight of polymers and extruding said dope into a coagulating bath to obtain coagulated shaped articles, followed by conventional after-processing including insolubilizing of polyvinyl alcohol by acetalization.

The invention also resides in a method (C), for producing shaped articles having highly flame-retardant property, which comprises treating shaped articles whose principal constituents are a halogen-containing polymer and partially acetalized polyvinyl alcohol with an aqeuous solution of a tin salt of a strong acid followed by the successive steps of washing with water or neutralizing with aqueous alkali solution, washing with water and drying.

The halogen-containing polymers which may be used in the present invention include homopolymers of vinyl chloride, vinylidene chloride and chloroprene, copolymers of two or more of the foregoing compounds or of any of these compounds with other copolymerizable monomers, and halogenated polymers such as chlorinated polyethylene, chlorinated polypropylene, chlorinated polyvinyl chloride, and polymer blends of the foregoing members. It is preferred to use polymers having a halogen content of 20 percent by weight or more.

For the shaped articles of the present invention it is essential to include therein from 0.1 to 15 percent by weight of tin substantially in the form of stannic acid, based upon the weight of the halogen-containing polymer and the polyvinyl alcohol (including the acetal thereof). If the tin content is less than 0.1 percent by weight, the optimum flame-retardant property is not achieved; at levels above 15 percent by weight, it is difficult to incorporate the tin uniformly by using commercially practical means, so that the resultant products lose their economical values, and general properties of the products also tend to be degraded. The tin contents in question herein are the contents of stannic acid, stannic acid anhydride and stannic acid derivatives of the formula $-Sn-(OH)_m$ (m greater than 1), including those wherein a part of tin is chemically combined with the polyvinyl alcohol or polyvinyl chloride but this range does not include organic tin compounds used as thermal stabilizers for halogenated compounds such as polyvinyl chloride and polyvinylidene chloride, such as alkyl tin carboxylic acid ester (e.g. most commonly used dibutyl tin dilaulate, etc.) and mercaptides; but, of course, the addition of such thermal stabilizers, quite separately from the tin in the form of stannic acid, is not excluded in the method of the present invention.

Shaped articles of the present invention can be prepared, in general, according to any one of three embodiments which are different from each other in the step of addition of tin substantially in the form of stannic acid into the shaped articles, i.e. in one embodiment the addition is made at the acetalizing step which is carried out to insolubilize polyvinyl alcohol after shaping such as spinning, in another embodiment the addition is made to a dope which is to be extruded in a coagulation bath and in a further embodiment, the addition is made at the after treatment step.

Accordingly, an explanation will be given to a common preparation method disregarding the addition of tin substantially in the form of stannic acid for a moment.

Shaped articles of the present invention are prepared at first by blending a halogen-containing polymer and polyvinyl alcohol, by a unique method. For example polymer-blend fibers are produced by a method: in which an emulsion obtained by polymerizing a halogen-containing vinyl compound such as vinyl chloride, vinylidene chloride, chloroprene is mixed with an aqueous solution of polyvinyl alcohol and the resultant solution is extruded into a coagulating solution and resultant shaped articles, e.g. filaments are stretched on heating and subjected to heat treatment.

The emulsion spinning technique was described in detail in a lecture at the 21st annual meeting of the Japanese Chemical Society, and is also disclosed in U.S. Pat. No. 3,111,370. According to this technique, a matrix component of a water-soluble polymer (such as polyvinyl alcohol) is added to a uniform emulsion of a halogen-containing polymer, in order to improve the viscosity and spinnability of the latter; that is to say, the matrix imparts sufficient cohesiveness to the particles of the emulsion so as to enable to form continuous filaments from the latter. The resultant mixture can then be extruded into an aqueous solution of an inorganic salt or into an organic solvent, if a wet process is being used; alternatively, it is also possible to use a dry process, in which case water is evaporated off from the extruded filaments. Thus fibers are produced according to the present process in which the polymer particles from the emulsion are uniformly dispersed in the matrix component. The matrix component can then be removed by dissolution or burning off, or it can be insolubilized by acetalization or esterification. The polymer particles originating from the emulsion can be made coherent by heating or by treating with a solvent.

In the case of the present invention, it is preferred to use a halogen-containing graft copolymer, such as a polymer obtained by graft-copolymerizing vinyl chloride onto a polyvinyl alcohol backbone, in order to assist in stabilizing the mixture of the polyvinyl alcohol solution and the halogen-containing polymer emulsion. It is preferable to use the ratio of polyvinyl chloride : polyvinyl alcohol of 2:8–8:2.

Resistance to hot water can then be imparted to the shaped articles thus obtained by subjecting them to an acetalization treatment. The acetalizing bath contains a conventional acetalizing agent, for instance, an aldehyde such as formaldehyde, acetaldehyde, benzaldehyde, furfural or glyoxal; a strong acid, as a catalyst, for example, hydrochloric acid or sulfuric acid; and an alkali metal salt or ammonium salt thereof, as an anti-swelling agent, such as sodium sulfate or ammonium sulfate. It is generally preferred to use formaldehyde as the acetalizing agent, but any one of other aldehydes may be used if it is desired.

The ratio of acetalizing agent in the bath to polyvinyl alcohol in the shaped article can be selected optionally, to give a degree of acetalization of up to 60 percent by mol, depending upon the intended use of the article. The requirements for hot water resistance of most common shaped articles are met by a degree of acetalization of from 20 to 50 percent by mol.

It is found generally preferable to introduce tin substantially in the form of stannic acid into the shaped articles of the present invention at this acetalization stage. The acetalizing bath will, in that case, contain a tin salt of a strong acid. The amount of strong acid used as a catalyst in the bath can then be chosen in accordance with the amount of tin salt used. Any tin salt which is soluble in the acidic acetalizing bath, for example, stannic chloride, stannous chloride and stannic sulfate; and any tin compounds which are converted in site into a tin salt of a strong acid can be used but stannic chloride is generally found to be most effective. Before acetalization, the polyvinyl alcohol component in the fibers or other articles has a large capacity to absorb water. Consequently, the tin salt in the acetalizing bath readily permeates into the interior of the articles and becomes progressively more fixed in the articles as the acetalization reaction progresses. The acetalized fibers or other articles are then washed in water; and the tin salt with which they have become impregnated is converted therein by hydrolysis to the insoluble form of stannic acid or a stannic acid derivative, as the pH rises with the dilution of the acidic acetalization liquor. It is also believed that a part of the tin salt penetrating into the articles simultaneously undergoes conversion into the stannic acid form by interaction with the polyvinyl alcohol, even before washing with water. After washing, the shaped articles can be subjected to conventional steps such as scouring, bleaching, neutralization and oiling, if desired, and are the dried — [Method (A)].

The shaped articles of the present invention are made also be adding stannic acid or stannic acid anhydride in the dope to be extruded into a coagulating bath. In case of fibers, it is preferred to use the emulsion spinning technique. For example an emulsion (a concentration of 25–40 percent by weight is preferable) obtained by emulsion polymerization of a halogen-containing vinyl compound (e.g. vinyl chloride or vinylidene chloride) and an aqueous dispersion of stannic acid or stannic acid anhydride (a concentration of 10–25 percent by weight is preferable) are mixed with an aqueous solution (a concentration of 15–20 percent by weight is preferable) of polyvinyl alcohol. The mixture is subjected to emulsion spinning, and the resulting filaments are stretched whilst heating them subjected to heat setting treatment — [Method (B)].

Furthermore, it is also found that the shaped articles of the invention can be made by immersing the articles whose principal components are partially acetalized polyvinyl alcohol and a halogen-containing polymer, that is, the acetalized articles obtained by acetalizing the articles whose principal components are polyvinyl alcohol and a halogen-containing polymer in the conventional acetalizing bath, in an aqueous solution of tin salt of strong acid and washing with water or with dilute alkaline solution and then drying — [Method (C)].

As in the case of the method (A), tin salt penetrated into the acetalized articles is converted by hydrolysis to the insoluble form of stannic acid or stannic acid derivatives as the pH rises with the dilution or the neutralization of the treating solution during washing.

It will be understood that, apart from the principal constituents of the halogen-containing polymer and the polyvinyl alcohol, the articles of the invention may also comprise conventional organic or inorganic additives, such as delustering agents (e.g. titanium oxide), pigments, thermal stabilizers and modifiers.

It is found that according to the fibers having a composition of the present invention, it is possible to obtain fabrics which, when tested by the vertical combustibility method of Japanese Industrial Standard (J.I.S.) L-1079, burn with decomposition and carbonization at the point in contact with the flame, but are self-extinguishing on removal of the igniting-flame, with no residual flame or smouldering and an extremely short carbonization distance. The invention also makes it possible to obtain films which achieve a first grade pass when tested by the method for flame-retardance of thin materials set out in J.I.S. Z-2150. Fabrics made of fibers of the present invention show no substantial reduction in flame-retardant property during the processing steps used to produce finished products, for example dyeing or scouring, nor in practical tests such as dry cleaning and washing (set out in J.I.S. L-0860 and J.I.S. L-1045), nor upon the natural exposure of the finished products. Fibers of the invention also show good general properties, such as mechanical strength, elasticity, thermal resistance, dye-ability, handle, fastness to light and weathering; in fact, these properties are, generally, superior to those containing no stannic acid.

The invention is illustrated by the following Examples, in which all parts are by weight unless otherwise stipulated.

EXAMPLE 1

A 20 percent aqueous spinning solution having a polyvinyl chloride (PVC) : polyvinyl alcohol (PVA) ratio of 5:5 was obtained by adding an aqueous solution of PVA to 31% percent aqueous emulsion havng a particle size of 300 A, a viscosity of 15 cp and prepared by polymerizing a mixture of 32 parts of vinyl chloride, 65 parts of water and 2 parts of polyvinyl alcohol (saponification degree of nearly 100 percent and polymerization degree of 500) at 45°C. in an autoclave in the presence of 0.9 part of sodium lauryl sulfate emulsifier and 0.07 part of potassium persulfate catalyst. The solution was used for wet emulsion spinning by extruding it at 20 m/min from a spinneret having 500 holes, into a saturated aqueous solution of sodium sulfate (350 g/l) at 45°C., with a take up speed of 60 m/min. The filaments produced were successively subjected to a heat treatment by passage through a saturated aqueous solution of sodium sulfate at 95°C., washing with water, drying at 90°C., and stretching 7 times finally for 2 minutes by heating at 180°C. and then at 230°C., to give a polymer blend fiber having PVC:PVA ratio of 5:5.

The filaments were immersed in an acetalizing bath containing 14 parts of sulfuric acid, 11 parts of sodium sulfate, 6 parts of formaldehyde, 7 parts of stannic chloride and 62 parts of water at 70°C. for 60 minutes; and then the filaments were pressed to squeeze off remaining liquor, washed with hot water at 40°C., further washed with hot water containing 15 g/l of sodium carbonate at 50°C., washed again with water, treated with a finishing oil, crimped, cut into 3D staple fibers and dried. The fibers had PVC:PVA ratio 5:5 and a tin content of 1.4% substantially in the form of stannic acid.

Curtains made from these staple fibers by spinning, dyeing and weaving, fully passed the flame-retardant test prescribed by the Japanese fire-fighting law; and when they were subjected to the vertical testing method prescribed in J.I.S. L-1079 (the same procedure as AATCC-34-1966), the curtains showed decomposition and carbonization only at the part in contact with the igniting flame, with no residual flame and no embers.

Even when the curtains were subjected to the repeated dry-cleaning and washing test prescribed in J.I.S. L-0860 and J.I.S. L-1045, no substantial reduction in flame-retardant property was observed.

As a control, curtains were made from 3D 64 mm long staple fibers obtained by treating homogeneous blended fibers having a PVC:PVA ratio of 5:5 with a conventional acetalizing bath consisting of sulfuric acid (14%), sodium sulfate (11%), formaldehyde (6%) and water (69%). Some of these curtains, depending upon their weight per unit area, starching agent, finishing agent, etc. did not pass the flame-retardant test prescribed in the Japanese fire-fighting law, and showed residual flames in the vertical method test prescribed in J.I.S. L-1079, with a large carbonization distance.

As another control, filaments consisting of 100% polyvinyl alcohol were treated with the same acetalizing bath containing stannic chloride. Curtains made from 3D 64 mm long staple fibers as before did not pass the flame-retardant test prescribed in the Japanese fire-fighting law.

EXAMPLE 2

A 16% aqueous solution of polyvinyl alcohol (saponification degree of nearly 100% and mean polymerization degree of 1700) and titanium oxide (as a delustering agent) were added to an emulsion mixture obtained by polymerizing a mixture of 3 parts of vinylidene chloride, 29 parts of vinyl chloride, 65 parts of water and 2 parts of polyvinyl alcohol in the presence of sodium lauryl sulfate and potassium persulfate, to give a spinning solution from which a homogeneous blend fiber having a PVDC:PVC:PVA ratio of 0.4:3.6:6 and containing 0.5% $TiO_2$ was obtained by wet emulsion spinning.

The fibers were acetalized, pressed to remove excess liquor and washed, as in Example 1, except that 6 parts of stannous chloride were used instead of 7 parts of stannic chloride in the acetalizing bath of Example 1. After bleaching with a 0.2% aqueous solution of sodium hypochlorite, the fibers were washed with a 2% aqueous solution of sodium carbonate and then with water, to produce 2D crimped staple fibers. These fibers had a tin content of 1.6% substantially in the form of stannic acid and were superior in mechanical properties, heat-resistance, light-fastness and dyeability, to control fibers prepared using a conventional acetalizing bath containing no stannous chloride.

When the fibers were loosely compressed into a cubic form, introduced into the flame of a gas burner and slowly taken out of the flame, the flame on the fibers of the invention became immediately extinct and they stopped burning, whereas the flame on the control fibers continued burning for a time and the remaining part continued souldering.

EXAMPLE 3

An aqueous solution of polyvinyl alcohol (15%) and a partially methylolated product of polyacrylamide (PAM) having a methylolation degree of about 50% were added to an emulsion obtained by polymerizing vinyl chloride (30%) in an aqueous solution of polyvinyl alcohol (2.5%) to prepare a spinning solution which was then processed as in Example 1, giving a polymer blend fibers having a PVC:PVA:PAM ratio of 55:40:5.

The fibers were immersed for 45 minutes at 70°C in an acetalizing bath containing 10 parts of sulfuric acid, 10 parts of sodium sulfate, 7 parts of formaldehyde, 73 parts of water and 7 parts of crystalline stannic chloride ($SnCl_4.5H_2O$). After the same bleaching treatment as in Example 2, the acetalized fibers were cut into crimped staple fibers. These staple fibers had a tin content of 0.8% substantially in the form of stannic acid, and had good flame-retardant property, with no residual flames, and no reduction in the flame-retardant property even after repeated extraction with trichloroethylene or hot water.

EXAMPLE 4

32 parts of a 20% aqueous emulsion prepared by emulsifying chlorinated polyethylene (containing 50% by weight of chloride) were mixed with 67 parts of a 17% aqueous solution of polyvinyl alcohol, to prepare a spinning solution which was then spun by the wet emulsion process to produce polymer-blend fibers containing 70% of PVA. The fibers were treated in the same way as in Example 3, and showed a high degree of flame-retardant property.

EXAMPLE 5

Various amounts of polyvinyl alcohol were added to four batches of an aqueous emulsion containing polyvinyl chloride as the principal component, to prepare spinning solutions which were then spun by the wet emulsion process, followed by wet heat treatment at 95°C., water washing, drying, stretching 2 times at 160°C. and heat treatment finally at 230°C., giving 4 batches of fibers having PVC:PVA ratios of 2:8, 4:6, 6:4 and 8:2, respectively.

The fibers were acetalized in an acetalizing bath containing 6% of stannic chloride, 10% of sulfuric acid, 10% of sodium sulfate, 7% of formaldehyde, and 67% of water, and finished by water washing, bleaching, neutralization and water washing.

These 4 batches of fibers contained 2.2%, 1.8%, 1.6% and 1.3% of tin, respectively, substantially all in the form of stannic acid. They all decomposed and carbonized when introduced into a flame but did not burn when taken out of the flame, showing good flame-retardant properties.

As a control, an attempt was made to prepare fibers having a PVC:PVA ratio of 9:1, but the preparation proved extremely difficult. The fibers were obtained in small yeild and with difficulty, and were weak and lacked in practical value. The fibers having a PVC:PVA ratio of 1:9 had unsatisfactory flame-retardant property and burning continued even after they were taken out of the flame, in spite of the content of 2.4% of tin substantially in the form of stannic acid.

EXAMPLE 6

A bundle of "Cordelan" fibers (Trade Mark of products of Kohjin Co. Ltd. made by the wet emulsion spinning of an emulsion containing a graft copolymer of vinyl chloride and vinyl alcohol, and an aqueous solution of polyvinyl alcohol) having a total PVC:PVA ratio of 5:5 in this case, was immersed in an aqueous solution of stannic chloride having a tin concentration of 3 percent, squeezed to remove excess liquor, washed with water, neutralized with a 20 g/1 aqueous solution of sodium carbonate, washed again with water, and dried. The fibers had a PVC:PVA ratio of 5:5 and a tin content of 1.2 percent (based upon the fiber-constituting principal components) substantially in the form of stannic acid.

The fibers showed superior flame-retardant property in comparison with Cordelan containing no stannic acid, and fabrics prepared therefrom showed no residual flame in the vertical flame-retardant test. The flame-retardant property was durable, no reduction thereof being observed on repeated washing and dry cleaning. The mechanical properties, heat-resistance, light fastness, dyeability, etc. were not inferior to those of the Cordelan containing no stannic acid. These properties are summarized in Tables I and II.

Table I

| Testing method<br>Sample | Boston method residual flame time | AATCC-34-1966 | | |
|---|---|---|---|---|
| | | residual flame time | residual ember time | carbonization area |
| "Cordelan" containing no stannic acid | 0–5 sec. | wholly burnt | — | wholly burnt |
| "Cordelan" containing stannic acid | 0 | 0 | 0 | 4–5 cm² |

Table II

Results of flame-retardant tests in accordance with the Japanese fire-fighting law

| Sample | Washing or dry cleaning | g/m² | Contact with flame for 60 sec. | | | Contact with flame for 3 sec. | | | Verdict |
|---|---|---|---|---|---|---|---|---|---|
| | | | Residual flame time (sec.) | Residual ember time (sec.) | Carbonization area (cm²) | Residual flame time (sec.) | Residual ember time (sec.) | Carbonization area (cm²) | |
| casement | | 180 | 0 | 0 | 5.0 | 0 | 0 | 4.5 | pass |
| | | | 0 | 0 | 5.2 | 0 | 0 | 5.0 | |

Table II — Continued

Results of flame-retardant tests in accordance with the Japanese fire-fighting law

| Sample | Washing or dry cleaning | g/m² | Contact with flame for 60 sec. | | | Contact with flame for 3 sec. | | | Verdict |
|---|---|---|---|---|---|---|---|---|---|
| | | | Residual flame time (sec.) | Residual ember time (sec.) | Carbonization area (cm²) | Residual flame time (sec.) | Residual ember time (sec.) | Carbonization area (cm²) | |
| A common "Cordelan" fabric | none | 250 plain weave fabric | 0<br>0<br>0 | 0<br>0<br>0 | 5.5<br>7.0<br>8.0 | 0 | 0 | 6.0<br>8.0 | not passed |
| | | | 0 | 0 | 10.0 | | | | |
| | | 440 triple weave fabric | 0<br>0<br>0 | 0<br>0<br>0 | 7.0<br>8.5<br>10.0 | 0<br>14.6 | 0<br>0 | 6.0<br>8.2 | not passed |
| | | 180 casement | 0<br>0 | 0<br>0 | 5.0<br>5.2 | 0<br>0 | 0<br>0 | 4.5<br>5.0 | pass |
| A "Cordelan" fabric containing stannic acid | none | 250 plain weave fabric | 0<br>0<br>0<br>0 | 0<br>0<br>0<br>0 | 5.5<br>6.0<br>7.2<br>9.0 | 0<br>0 | 0<br>0 | 6.0<br>8.0 | pass |
| | | 440 triple weave fabric | 0<br>0 | 0<br>0 | 8.0<br>8.3 | 0<br>0 | 0<br>0 | 8.0<br>8.0 | pass |
| | | | 0 | 0 | 9.2 | | | | |
| | After washing 10 times | 180 casement | 0<br>0<br>0 | 0<br>0<br>0 | 5.0<br>5.5<br>6.1 | 0<br>0 | 0<br>0 | 5.0<br>6.5 | pass |
| | | 250 plain weave fabric | 0<br>0<br>0 | 0<br>0<br>0 | 7.1<br>7.8<br>10.0 | 0<br>0 | 0<br>0 | 5.2<br>7.1 | pass |
| | | 440 triple weave fabric | 0<br>0<br>0 | 0<br>0<br>0 | 8.0<br>9.2<br>10.1 | 0<br>0 | 0<br>0 | 7.5<br>9.1 | pass |
| | After dry cleaning 10 times | 180 casement | 0<br>0<br>0 | 0<br>0<br>0 | 5.0<br>5.3<br>6.0 | 0<br>0 | 0<br>0 | 5.0<br>6.0 | pass |
| | | 250 plain weave fabric | 0<br>0<br>0 | 0<br>0<br>0 | 6.0<br>6.5<br>7.9 | 0<br>0 | 0<br>0 | 5.5<br>6.3 | pass |
| | | 440 triple weave fabric | 0<br>0 | 0<br>0 | 8.0<br>8.5<br>9.5 | 0 | 0 | 7.3<br>8.2 | pass |

EXAMPLE 7

A 16% aqueous solution of polyvinyl alcohol and a 17% aqueous dispersion of stannic acid were added to an emulsion obtained by polymerizating a mixture of 32 parts of vinyl chloride, 65 parts of water and 2 parts of polyvinyl alcohol (saponification degree of nearly 100 percent and polymerization degree of 500) in the presence of sodium lauryl sulfate and potassium persulfate, to give a dope.

The dope was subjected to wet emulsion spinning to give a polymer blend fibers having PVC:PVA: stannic acid of 5:5:0.4.

The fibers were acetalized in an acetalizing bath containing 15% of sulfuric acid, 10% of sodium sulfate, 7% of formaldehyde and 68% of water. After the same bleaching treatment as in Example 2, the acetalized fibers were cut into crimped staple fibers.

These staple fibers showed superior flame-retardant property in that they burnt with carbonization and decomposition only at the point in contact with flame when introduced into flame, but they were self-extinguished immediately when taken out of flame. Whereas, control fibers having no stannic acid kept burning a moment even after when taken out of flame.

EXAMPLE 8

Films were prepared by subjecting a dope obtained by the same procedure as that of Example 7, to the steps of casting, drying and streching (2 times) whilst heating at 160°C. giving PVC:PVA: stannic acid ratio of 50:50:4. These films showed superior flame-retardant property, in that they showed carbonization and decomposition when introduced into the flame of an alcohol lamp but did not burn when taken out of the flame. Control films having a composition of PVA:stannic acid=100:10, prepared from a dope containing a 17% aqueous solution of polyvinyl alcohol and an aqueous dispersion of stannic acid, continued to burn violently and were completely consumed.

EXAMPLE 9

A spinning solution was prepared by adding 67 parts of a 17% aqueous solution of polyvinyl alcohol to 33 parts of an emulsion mixture containing polyvinyl chloride (20%) and polyvinylidene chloride (10%) as principal constituents. The solution was processed as in Example 1, to prepare fibers containing, as principal constituents, polyvinyl chloride, polyvinylidene chloride and polyvinyl alcohol.

The resultant fibers were acetalized in an acetalized in an acetalizing bath containing 8% of stannous chloride, 14% of sulfuric acid, 10% of sodium sulfate, 7% of formaldehyde and 61% of water. After washing with water, bleaching, neutralization and cleaning, the fibers having a PVC:PVCD:PVA:stannic acid ratio of 3:1.5:0.5 were spun and woven into fabrics.

The fabrics showed remarkable flame-retardant property, in that they completely passed the flame-retardant test prescribed in the Japanese fire-fighting law, irrespective of their design or weight per unit area, or the kind of oiling agent used for finishing. These flame-retardant property was not reduced by repeated dry-cleaning 5 times or washing 5 times, and the fabrics completely passed the above-mentioned flame-retardant test.

What is claimed is:

1. A method for producing shaped articles having durable, highly flame-retardant properties which comprises a chlorine-containing polymer and partially acetalized polyvinyl alcohol, as principal constituents, in a weight ratio of 2:8 to 8:2 and 0.1 to 15% of tin substantially in the form of stannic acid based upon the total weight of the above-mentioned principal constituents, which method comprises mixing an aqueous emulsion of a chlorine-containing polymer, an aqueous solution of polyvinyl alcohol and an aqueous dispersion of stannic acid to give a dope having a ratio of polyvinyl alcohol to said chlorine-containing polymer of 2:8–8:2 and a stannic acid content of 0.15–5 percent per total weight of polymers and extruding said dope into a coagulating bath to obtain coagulated shaped articles, followed by conventional after-processing including insolubilizing of polyvinyl alcohol by acetalization, said chlorine-containing polymer being a member selected from the group consisting of polymers of vinyl chloride, vinylidene chloride, chloroprene, copolymers of the foregoing compounds, copolymers of any of these compounds with other monomers copolymerizable therewith, chlorinated polyvinyl chloride, chlorinated polyethylene, chlorinated poly-propylene and polymer-blends of the foregoing polymers.

2. A method according to claim 1 wherein said shaped articles are in the form of fibers, said aqueous emulsion of a chlorine-containing polymer is a 25 to 40 percent aqueous emulsion of a graft copolymer consisting of polyvinyl alcohol as a backbone and polyvinyl chloride as grafts, said aqueous solution of polyvinyl alcohol has 15–20 percent by weight concentration and said aqueous dispersison of stannic acid has 10–25 percent by weight concentration.

* * * * *